US007144324B2

(12) United States Patent
Yarbrough et al.

(10) Patent No.: US 7,144,324 B2
(45) Date of Patent: Dec. 5, 2006

(54) ELECTRONIC DISPLAY TO POST GAMING LIMITS

(76) Inventors: Jay W. Yarbrough, 982 Pescados Dr., Las Vegas, NV (US) 89123; John S. Guthrie, 1800 Edmund #137, Las Vegas, NV (US) 89123; William J. Cummins, 2204 San Deluna, Las Vegas, NV (US) 89108

( * ) Notice: Subject to any disclaimer, the term of this patent is extended or adjusted under 35 U.S.C. 154(b) by 541 days.

(21) Appl. No.: 10/609,404

(22) Filed: Jul. 1, 2003

(65) Prior Publication Data

US 2004/0082389 A1 Apr. 29, 2004

Related U.S. Application Data

(60) Provisional application No. 60/421,578, filed on Oct. 28, 2002.

(51) Int. Cl.
*A63F 13/00* (2006.01)

(52) U.S. Cl. ............................ 463/46; 463/20; 463/25; 463/26

(58) Field of Classification Search .................. 463/46, 463/47; 345/1.1–1.3, 30–32; 362/600–634, 362/26, 30; 340/286.01, 815.44, 815.73; 40/124.01, 124.02, 219, 541, 443–446, 361, 40/367, 437, 442–445, 489, 502, 569, 369, 40/374; 364/411

See application file for complete search history.

(56) References Cited

U.S. PATENT DOCUMENTS

| | | | | |
|---|---|---|---|---|
| 2,992,364 | A | | 7/1961 | Rasmussen |
| 3,717,867 | A | | 2/1973 | Rosenzweig |
| 3,981,002 | A | | 9/1976 | Gardner |
| 4,109,245 | A | | 8/1978 | Hedin |
| 4,139,841 | A | | 2/1979 | Roberts |
| 4,751,506 | A | * | 6/1988 | Brown ........................ 345/46 |
| 4,837,957 | A | | 6/1989 | Egender |
| 4,967,194 | A | | 10/1990 | Haruki |
| 5,429,361 | A | | 7/1995 | Raven et al. |
| 5,612,711 | A | | 3/1997 | Rose |
| 5,664,862 | A | * | 9/1997 | Redmond et al. ........... 362/625 |
| 5,678,334 | A | * | 10/1997 | Schoniger .................... 40/546 |
| 5,685,779 | A | * | 11/1997 | Tsoukalas ...................... 473/1 |
| 5,894,261 | A | | 4/1999 | Green |
| 5,934,676 | A | | 8/1999 | Rubin |
| 6,052,054 | A | | 4/2000 | Hampson |

(Continued)

FOREIGN PATENT DOCUMENTS

| | | | |
|---|---|---|---|
| GB | 2139796 A | * | 11/1984 |
| GB | 2386460 A | * | 9/2003 |
| WO | WO01/15051 | | 3/2001 |

*Primary Examiner*—Xuan M. Thai
*Assistant Examiner*—Ross A. Williams
(74) *Attorney, Agent, or Firm*—Richard C. Litman

(57) ABSTRACT

An electronic display to post monetary gaming limit amounts in programmable manner while including other fixed graphics or logos and background lighting. The device includes a pedestal or stand, a rectangular box housing, electronic circuit board including LED numeric displays, programming switches, a plastic sheet and special LED lights. The housing holds the electronic circuit board, LED numeric displays, power supply, programming switches, backlighting LED arrays and provides grooves for the plastic sheet to slide in and out. The special LED lights are sized and shaped small enough to fit in the bottom groove to backlight the plastic sheet from the bottom edge of the sheet for more diffuse light over the entire area of the sheet and fixed graphics.

16 Claims, 5 Drawing Sheets

U.S. PATENT DOCUMENTS

| | | | | |
|---|---|---|---|---|
| 6,294,983 | B1 * | 9/2001 | Lee | 340/332 |
| 2003/0054887 | A1 * | 3/2003 | Dettrey et al. | 463/42 |
| 2004/0004827 | A1 * | 1/2004 | Guest | 362/31 |
| 2004/0166966 | A1 * | 8/2004 | Nielsen | 473/451 |

* cited by examiner

ELECTRONIC DISPLAY TO POST GAMING LIMITS

CROSS-REFERENCE TO RELATED APPLICATION

This application claims the benefit of U.S. Provisional Patent Application Ser. No. 60/421,578, filed Oct. 28, 2002.

BACKGROUND OF THE INVENTION

1. Field of The Invention

The present invention relates to a display for a gaming table used in casino or other gaming establishments to post monetary gaming limit amounts in a programmable electronic manner which includes other graphics, logos and background lighting.

2. Description of Related Art

Related art signs or displays for posting gaming table numeric monetary limits employ panels with fixed numerals for numeric monetary limits, as well as fixed logos or graphics for name of the game table and name of the casino. The logo, graphics or numerals are painted on the fixed panels. The only way to change the numeric monetary limits for a game is to slide the old panel(s) out and replace it with a new one in the front of the box. Therefore, the new panel with the desired numerical limit and logo that match the table would have to be prepared and made available ahead of time. Related art of this type can be seen at: www.actionpackedgaming.com.

Signs or displays to display numeric amounts or scores using electrically programmable electronic displays are known. Disclosures of this type are: U.S. Pat. No. 2,992,364 issued to Rasmussen on Jul. 11, 1961; U.S. Pat. No. 3,717,867 issued to Rosenzweig on Feb. 20, 1973; U.S. Pat. No. 3,981,002 issued to Gardner on Sep. 14, 1976; U.S. Pat. No. 4,109,245 issued to Hedin on Aug. 22, 1978; U.S. Pat. No. 4,139,841 issued to Roberts on Feb. 13, 1979; U.S. Pat. No. 4,751,506 issued to Brown on Jun. 14, 1988; U.S. Pat. No. 4,837,957 issued to Egender on Jun. 13, 1989; U.S. Pat. No. 4,967,194 issued to Haruki on Oct. 30, 1990; U.S. Pat. No. 5,429,361 issued to Raven et al. on Jul. 4, 1995; U.S. Pat. No. 5,612,711 issued to Rose on Mar. 18, 1997; U.S. Pat. No. 5,894,261 issued to Green on Apr. 13, 1999; U.S. Pat. No. 5,934,676 issued to Rubin on Aug. 10, 1999; U.S. Pat. No. 6,052,054 issued to Hampson on Apr. 18, 2000; PCT Patent WO 01/15051 A2 issued on Mar. 1, 2001.

These types of signs or displays often use more than two switches to set one or more of the numeric electronic displays, or do not include a backlit plastic panel having the logo or graphics describing what numeric amount is displayed. They often use programming cards or other devices more complicated than switches to program the numeric electronic displays. Some display more than just numerical digits, such as changeable text requiring more complicated programming of the display.

It would be desirable to have an electronic display panel or sign that has programmable numeric electronic displays in conjunction with a backlit panel, and having fixed logo and graphics describing the game and casino. The electronic programmable display would have only two switches to program the programmable numeric display. A panel slides in and out of the display to be changed only when used at a different game table or other times when the fixed logo and graphics need changing. Backlighting of the panel is done on the edges of the panel in the groove using lighting elements that mount in the groove for more diffuse and uniform lighting of the panel.

None of the above inventions and patents, taken either singly or in combination, is seen to describe the instant invention as claimed.

SUMMARY OF THE INVENTION

The present invention is an electronic display to post monetary gaming limit amounts in a programmable manner, while including other fixed graphics, logos and background lighting. The device includes a pedestal or stand, a rectangular box housing, electronic circuit board including LED (light emitting diodes) numeric displays, programming switches, a plastic sheet to provide the fixed graphics and special backlighting LED arrays. The housing provides a case for the electronic circuit board, LED numeric displays, power supply, programming switches, backlighting LED array and a groove for holding the plastic sheet to slide in and out.

The switches allow a casino or gambling house to programmably set the numeric limit amount for the game while other fixed graphics or logos on the plastic panel are not changed. The switches allow a casino or gambling house to programmably set the color that the special LED lights provide. The removable sheet provides the fixed graphics and logo appropriate for the game. The fixed graphics and logo are engraved into the plastic sheet. Special LED lights mounted on the bottom of pc board extend out into the bottom groove to back light the bottom edge of the sheet providing diffuse lighting over the entire area of the sheet. The sheet sits on top of the special backlighting LEDs when slid into the groove of the housing.

Accordingly, it is a principal object of the invention to provide an electronic display, which includes a programmable electronic display for a gaming table.

It is another object of the invention to provide an electronic display wherein the electronic programmable display is programmed through two momentary pushbutton switches.

It is a further object of the invention to provide an electronically programmable display that uses a plastic sheet having etched or engraved logos that slides in and out along a groove in the box.

Still another object of the invention is to provide an electronically programmable display wherein colors of the backlighting of the panel is programmed through two momentary pushbutton switches.

Still another object of the invention is to provide an electronically programmable display that uses special LEDs that mount in the groove along the bottom edge of the panel so that it is diffusely backlight.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
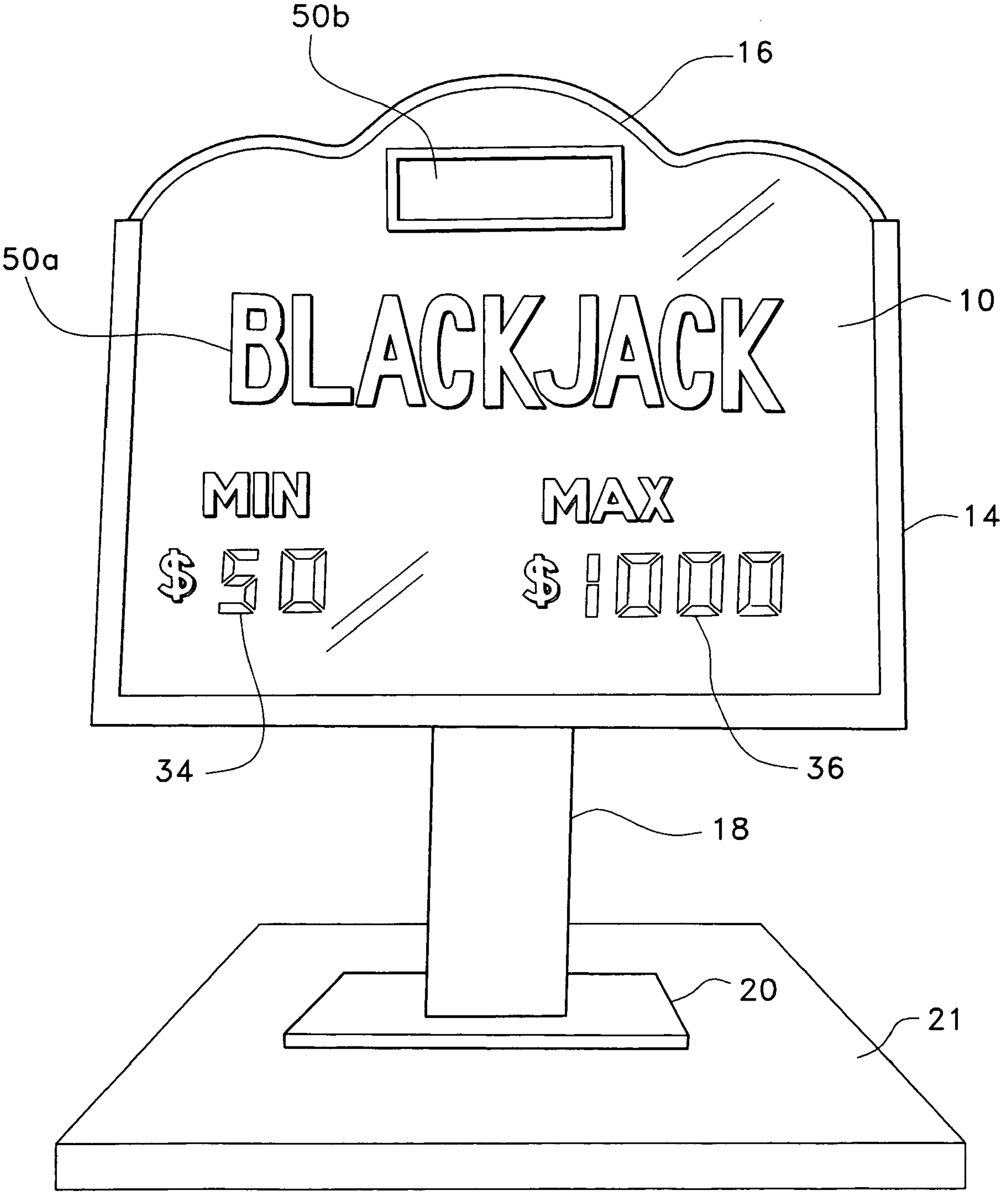
FIG. 1 is an environmental, perspective front view of an electronic display to post gaming limits according to the present invention.

FIG. 1 shows a programmable electronic display for displaying the numerical limit amounts 34, 36 and appropriate logo 50*a* or graphics 50*b* for a gaming table 21 in a gaming organization. FIG. 1 shows the display box 14 sitting next to or on top of the gaming table 21 via pedestal 20 and arm 18. The display box 14 is rectangular shaped. It includes a front panel 10 showing the numerical limit display 34, 36, and has appropriate text logo 50*b* or graphics 50*a*. The numerical limit display 34, 36 is usually a multidigit 7 segment numeric LED display array. It is used to display the lower and higher limits of the game being played at the table 21.

Figure 2:
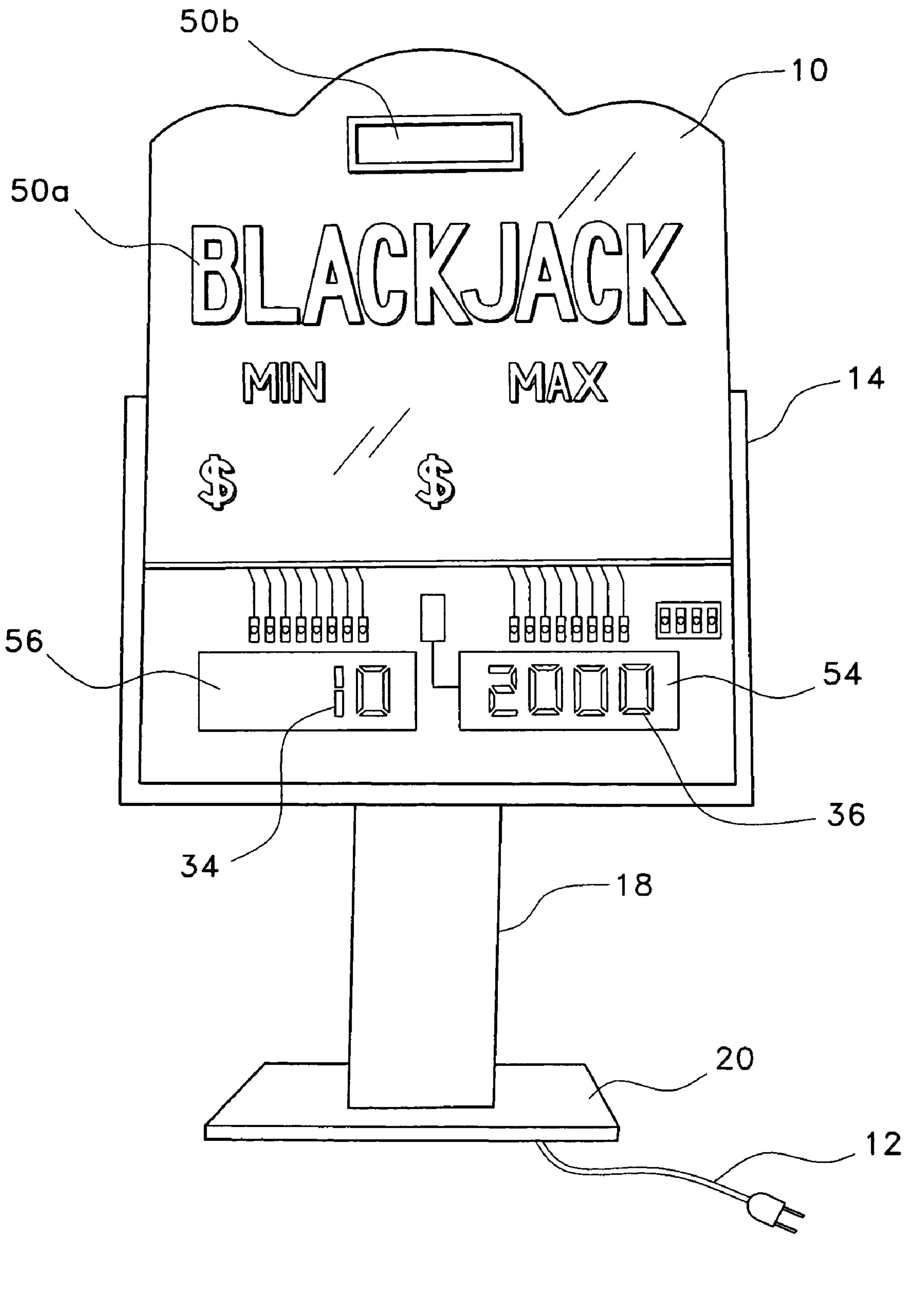
FIG. 2 is a front view of FIG. 1 showing the plastic panel slid up to partly reveal the numeric LEDs and circuitry.

FIG. 2 shows a panel 10, which is made of a clear or smoked plastic which has been engraved with the text logo 50*b*, graphics 50*a* or other indicia. The power cord 12 shown in FIG. 2 provides power for the electronics in box 14 from a power adaptor plugged into a wall outlet. The LED displays 34, 36 show through an unengraved portion of panel 10. Some black backing may be mounted on the back of panel 10 in the area of the text logo 50*b* and graphics 50*a* to prevent electronics in the box 14 from showing through.

Figure 3:
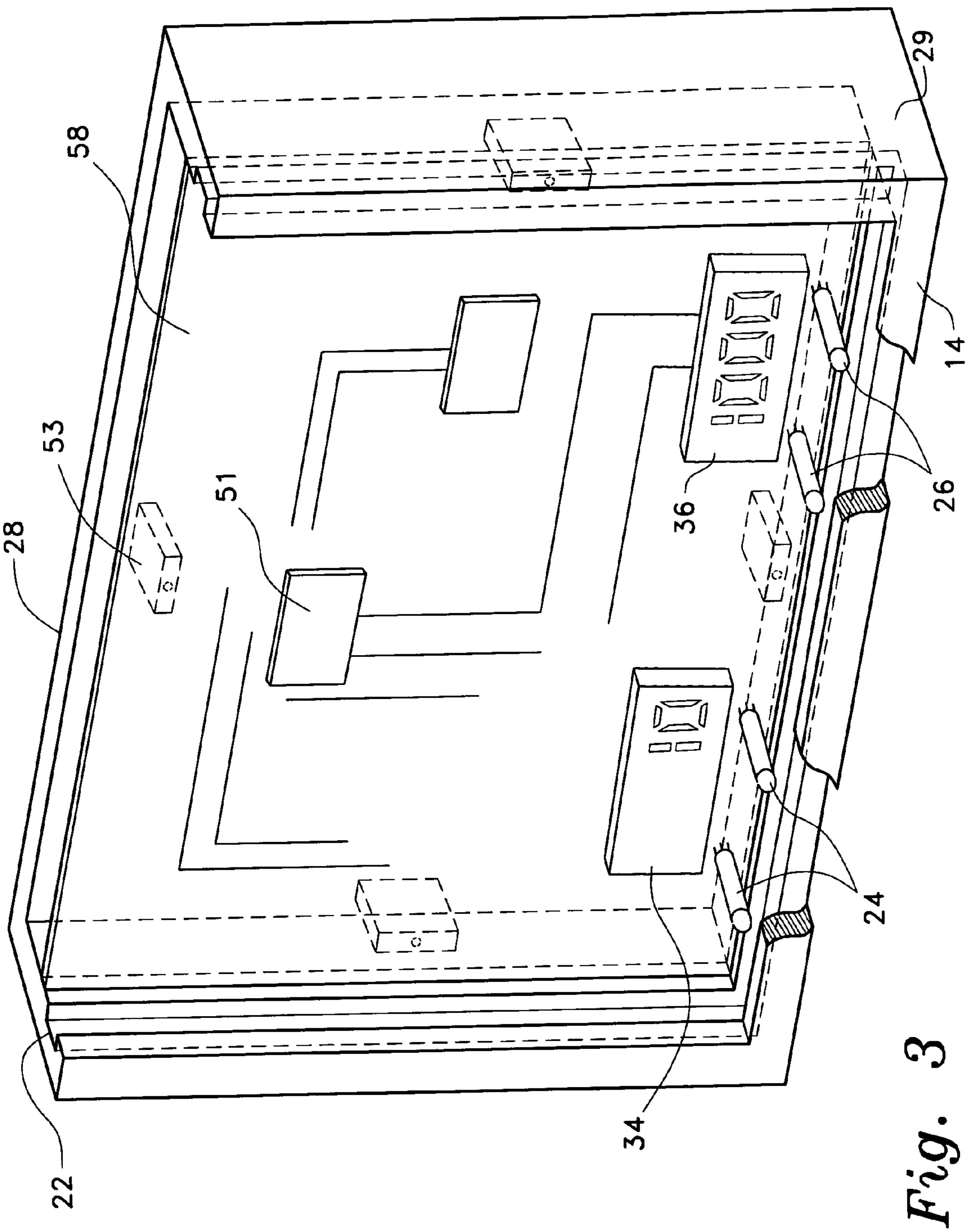
FIG. 3 is a cut away front perspective view of FIG. 1 with the plastic panel removed revealing the printed circuit board, backlighting LEDs, groove and other electronics.

As shown in FIGS. 2 and 3, the panel 10 slides in and out of the box 14 through a groove 22 that is just wide enough to hold the thickness of the panel 10. In the bottom most groove 22 is an LED backlight 24, 26 (not a numerical digital display) mounted on the pc board 58 so that it fits inside the width of the groove 22 and the edge of the panel 10 sits on top of the LEDS 24, 26. The LEDs 24, 26 are positioned within the bottom most groove 22 so that the majority of their light will go up into the edge of the panel 10. Thus, the panel 10 is lit up on an edge along its thickness. Therefore, the backlight 24, 26 provides a much more diffuse and uniform light covering of all the areas of the panel 10, than if backlit from a light source that was mounted directly behind the flat surface of the panel 10.

The light rays of the backlighting 24, 26 which are parallel to the plane of the surface of the panel hit the engraved text 50*a* and logos 50*b* and reflect or bend the rays at 90 degrees so that the lighting in the area of the engravings comes straight out to the eye of a viewer of the engraved text 50*a* and logo 50*b*.

The backlighting 24 and 26 will light the all areas of the panel 10 with the color they have been programmed set to. The engraved areas 50*a*, 50*b* of the panel 10 will be lit with the same but brighter or. lighter color as the background color emitted by the backlights 24 and 26.

As shown in FIG. 3, the LED numeric displays 34, 36, the multicolored LEDs 24, 26 and microcomputer chip 51 and other circuitry are mounted on the circuit board 58. The circuit board 58 is mounted on the edges of the box 14 using tabs 53. The pc board 58 is positioned within the depth of the box 14, so that the height of LED numeric displays 34, 36 comes close to the surface of the panel 10 near the engraved dollar signs. The backlighting LEDs 24, 26 are shown mounted on the bottom part of the pc board 58. The LEDs 24, 26 are mounted with a height from the pc board 58 so that the LEDs 24, 26 extend into the groove 22. The side edges of the panel 10 slide in the groove 22. The bottom edge of the panel 10 sits on top of the LEDs 24, 26. FIG. 3 also shows the open top of the box 14 also having a rear wall or clear or smoked plastic panel 28.

Figure 4:
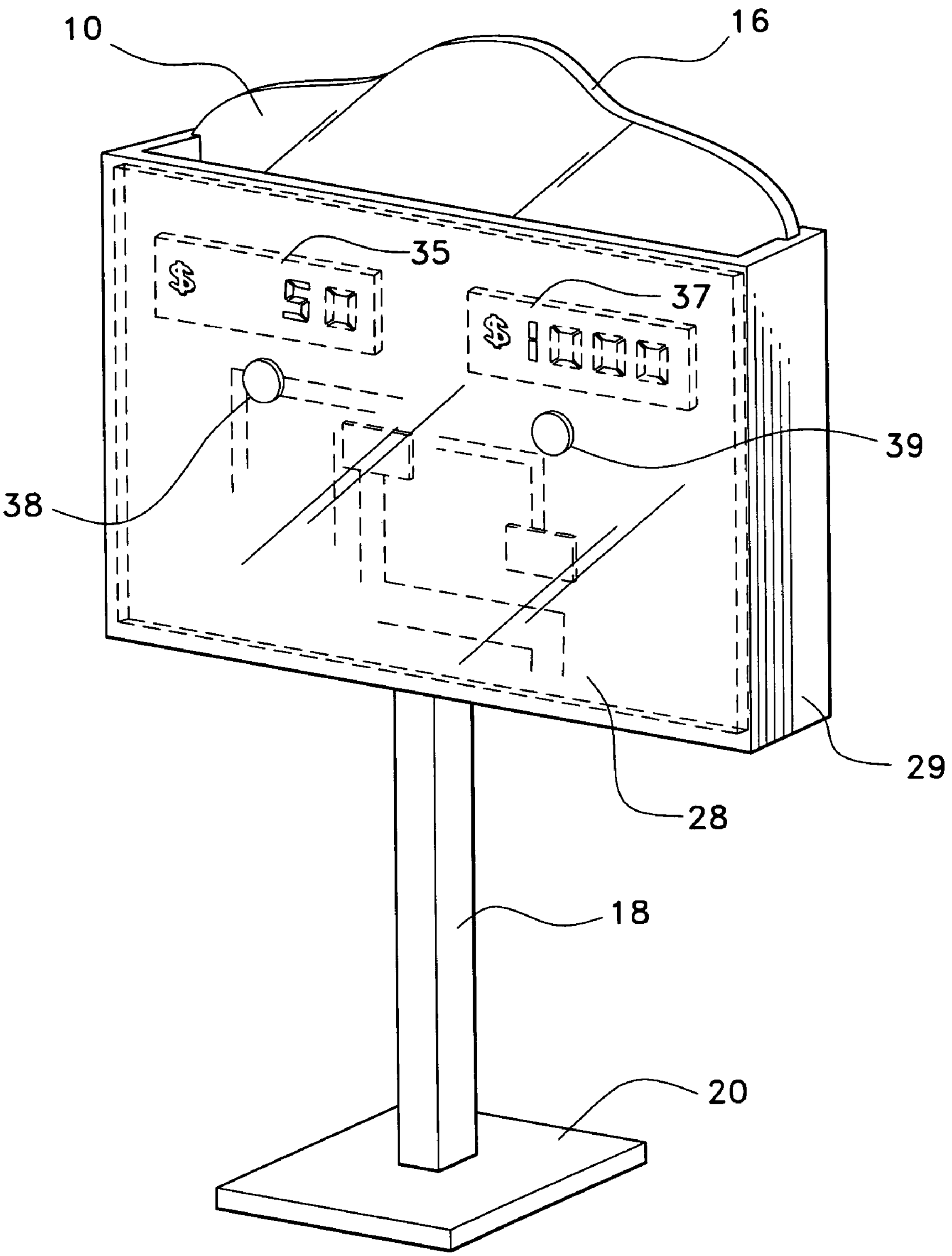
FIG. 4 is a back perspective view of the electronic display showing the programming button switches and duplicate numeric LEDs.

Push button switches 38, 39 are mounted on the PC board 58 and are situated so that their knobs are accessible to openings in the clear or smoked plastic panel 28 of the box 14 as shown in FIG. 4. Thus, the casino boss can conveniently and quickly change the limits of the LED numeric display 34, 36 on the front of the box 14, from behind the box 14 by pushing button switches 38 and 39 and watching respective duplicate numeric LEDs 35 and 37 on the back of the box 14. FIG. 4 also shows the solid side wall 29 and the raised part of the panel 10. The numeric display 34 in FIG. 3 showing the low or min limit of the game corresponds to the numeric display 35 on the back in FIG. 4. Correspondingly, the numeric display 36 in FIG. 3 showing the low or min limit of the game corresponds to the numeric display 37 on the back in FIG. 4.

Figure 5:
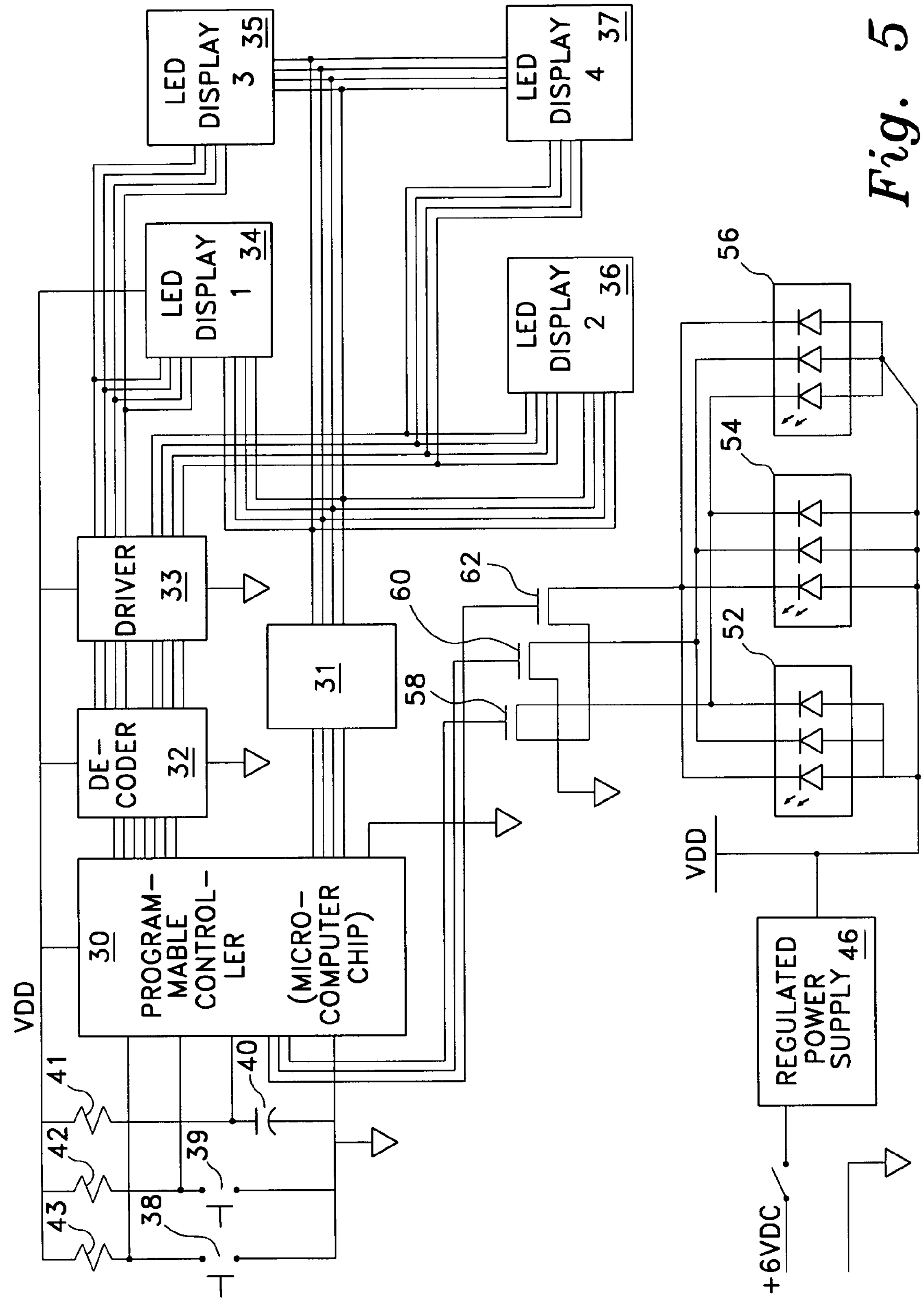
FIG. 5 is a circuit schematic of the electronics, LED's, switches and display controller used to program the numeric display.

FIG. 5 shows a schematic circuit diagram to illustrate the operation and connection of the electronics that program and drive the numeric LED display arrays 34, 35, 36 and 37 and backlight LEDs 24 and 26. FIG. 5 shows that all the circuits of FIG. 5 are powered by a regulated power supply 46 that receive an unregulated 6 V DC input from power cord 12, that may have some ripple left over from the AC power adaptor. The regulated power supply 46 provides a regulated or steady 5 V DC power output $V_{dd}$ to the rest of the circuits in FIG. 5.

The capacitor 40 and resistor 41 provide an RC time constant delay circuit for the reset input of the microcomputer 30. Thus, when the power switch turns on the regulated power supply 46, and 5 volts is first applied to capacitor 40 and resistor 41, they will send a delayed pulse for the proper power on reset input line of microcomputer 30. The microcomputer 30 will take care of its internal operations and provide a place in its reset routine to reset the displays 34 and 36 to zero or the smallest minimum or maximum.

The two switches 38, 39 are connected to input ports of the microcomputer chip 30 and have pull up resistors 43, 42. Thus inputs to the microcomputer chip 30 are at a high level near Vdd when the switches 38, 39 are in their normally open position. When the switches 38 or 39 are momentarily closed or pushed and released, the input ports will receive a low level near ground pulse.

The multidigit LED arrays 34–37 are connected and controlled through output ports of the microcomputer chip 30. Some of the output ports of microcomputer 30 are connected to the LED's 34–37 through a display driver 33 and decoder 32. All the numeric displays 34–37 are driven using drivers 31 and 33. Decoder 32 provides proper decoding of the signal lines from the microcomputer 30. The numeric LED display 35 is wired in parallel with the numeric LED display 34; therefore, numeric LED 34 on the front will show the same values as numeric LED 35 on the back. The numeric LED display 36 is wired in parallel with the numeric LED display 37; therefore, numeric LED 36 on the front will show the same values as numeric LED 37 on the back.

Three further outputs of microcomputer 30 are fed to driver transistors 58, 60 and 62 to drive the LEDs 52, 54, 56 at six different colors. A high and low output of the transistors 58, 60 and 62, that are output on three lines provides at the least 6 different voltages for generating six different colors. Vdd is provided to the common terminals of each of the LEDs 52, 54, and 56.

Each time switch 38 is pushed and released once for a short period of time, the microcomputer chip 30 sees the one active low pulse and changes the display of LED 34 and 35 by incrementing it by 1 or a specific amount and sends outputs on three output lines to the LEDs 52, 54 and 56 to change their color. Another short push and release will cause the same increment by 1 or a specific amount.

If the switch 38 is pushed and held down for a longer length of time, microcomputer chip 30 will respond to the longer length of time and increment the LED display by 1 or a specific amount at a faster rate. The faster rate will continue as long as the microcomputer 30 senses that the switch 38 is held down. The faster rate change also applies to the changing LEDs 52, 54 and 56 to emit different colors.

The incrementing of the LED display 34 continues until all the digits on the LEDs display the maximum amount at which point with the occurrence of the next switch 38 activation all the digits of the LED display will be 0 or specific minimum amount.

The same operation occurs using switch 39 to control microcomputer 30 to set and increment the numeric display on LED array 36. However, it is not required to have switch 39 change the colors emitted by LEDs 52, 54 and 56.

The difference between LED numeric multidigit displays 34 and 36 is that one shows the amount of the high limit of the game, and the other shows the amount of the low limit of the game. It might be that low limit of the game requires a different number of LED digits in the numeric display so that LED multidigit displays do not have to have the same number of digits.

It is to be understood that the present invention is not limited to the embodiments described above, but encompasses any and all embodiments within the scope of the following claims.

We claim:

1. An electronic display to post new gaming limits, comprising:

a housing having a rectangular back wall and peripheral sidewalls having a groove defined therein, the housing having an open top;

a transparent front panel slidably mounted in the groove;

a plurality of alphanumeric LED display integrated circuits mounted between the back wall and the front panel, the alphanumeric display integrated circuits being adapted for displaying maximum and minimum gaming limits through the transparent front panel;

a programmable display driver circuit electrically connected to the alphanumeric LED display integrated circuits, the driver circuit having a plurality of switches for changing characters displayed by the alphanumeric LED display integrated circuits;

a plurality of LED diode arrays disposed in the groove beneath the front panel, the diode arrays being configured to uniformly radiate a backlight through the front panel, each of the diode arrays being capable of emitting different colors in response to bias voltages applied to terminals of the diode arrays; and a diode array driver circuit electrically connected to the LED diode arrays and to the programmable display driver circuit for automatically changing the color of the backlight radiated by the LED diode arrays when the switches are actuated to change at least the minimum gaming limit displayed by the alphanumeric LED display integrated circuits.

2. The electronic display according to claim 1, wherein said front panel has a plurality of indicia formed thereon, the indicia being illuminated by the backlight radiated by said plurality of LED diode arrays.

3. The electronic display according to claim 1, wherein said front panel is formed from plastic, the front panel having text and graphics engraved therein, the text and graphics being illuminated by the backlight radiated by said plurality of LED diode arrays.

4. The electronic display according to claim 1, wherein the plurality of switches of said programmable display driver circuit are mounted in the rectangular back wall of said housing.

5. The electronic display according to claim 1, wherein said programmable display driver circuit includes:

a microcomputer chip having a plurality of input ports and a plurality of output ports, each of said switches being connected to a respective one of the input ports for changing the characters displayed by said LED display integrated circuits;

a decoder electrically connected to at least some of the output ports of said microcomputer chip; and a driver electrically connected between the decoder and the LED display integrated circuits.

6. The electronic display according to claim 1, wherein said diode array driver circuit further comprises a plurality of transistor drivers electrically connected to at least some of the output ports of said microcomputer chip and electrically connected to the terminals of said LED diode arrays, said microcomputer chip being configured to switch the transistor drivers on and off in various combinations when said switches are operated to change the characters displayed by said LED display integrated circuits in order to automatically change the color of the backlight.

7. The electronic display according to claim 1, further comprising a plurality of duplicate alphanumeric LED display integrated circuits mounted on the back wall of said housing, the duplicate alphanumeric LED display integrated circuits being electrically connected to said programmable display driver circuit, said programmable display driver circuit being configured to display characters on the duplicate LED display integrated circuits identical to the characters displayed on the plurality of LED displays mounted between the front panel and the back wall of said housing so that the same gaming limits are visible both through the front panel and in back of the housing.

8. An electronic display to post new gaming limits, comprising:

a housing;

a transparent panel mounted in the housing;

means for programmably displaying alphanumeric maximum and minimum gaming limits on the transparent panel;

means for radiating a backlight uniformly through at least a portion of the transparent panel; and means for automatically changing the color of the backlight when at least the minimum gaming limit is changed.

9. The electronic display according to claim 8, wherein said transparent panel has a plurality of indicia formed thereon, the indicia being illuminated by the backlight radiated by said means for radiating.

10. The electronic display according to claim 8, wherein said transparent panel is formed from plastic, the transparent panel having text and graphics engraved therein, the text and graphics being illuminated by the backlight radiated by said means for radiating.

11. The electronic display according to claim 8, wherein said means for programmably displaying alphanumeric gaming limits comprises:

a plurality of alphanumeric LED display integrated circuits mounted between said housing and the transparent panel, the alphanumeric display integrated circuits being adapted for displaying the gaming limits through the transparent panel; and a programmable display driver circuit electrically connected to the alphanumeric LED display integrated circuits, the driver circuit having a plurality of switches for changing characters displayed by the alphanumeric LED display integrated circuits.

12. The electronic display according to claim 11, wherein said switches are mounted in said housing.

13. The electronic display according to claim 12, wherein said programmable display driver circuit includes:

a microcomputer chip having a plurality of input ports and a plurality of output ports, each of said switches being connected to a respective one of the input ports for changing the characters displayed by said LED display integrated circuits;

a decoder electrically connected to at least some of the output ports of said microcomputer chip; and a driver electrically connected between the decoder and the LED display integrated circuits.

14. The electronic display according to claim 13, wherein said means for radiating a backlight comprises:

a plurality of LED diode arrays disposed in a groove in said housing beneath the transparent panel, the diode arrays being configured to uniformly radiate the backlight through the transparent panel, each of the LED diode arrays being capable of radiating different colors in response to bias voltages applied to terminals of the diode arrays; and a diode array driver circuit electrically connected to the LED diode arrays and to the programmable display driver circuit.

15. The electronic display according to claim 14, wherein said diode array driver circuit further comprises a plurality of transistor drivers electrically connected to at least some of the output ports of said microcomputer chip and electrically connected to the terminals of said LED diode arrays, said means for automatically changing the color of the backlight when the gaming limits are changed comprising said microcomputer chip being configured to switch the transistor drivers on and off in various combinations when said switches are operated to change the characters displayed by said LED display integrated circuits in order to automatically change the color of the backlight.

16. The electronic display according to claim 8, further comprising means for displaying a duplicate of the gaming limits on said housing opposite said transparent panel.

* * * * *